US008806560B2

(12) United States Patent
Kang et al.

(10) Patent No.: US 8,806,560 B2

(45) Date of Patent: Aug. 12, 2014

(54) METHOD AND APPARATUS FOR TRANSMITTING CONTENT, AND METHOD AND APPARATUS FOR RECEIVING CONTENT

(75) Inventors: Young-soo Kang, Seoul (KR); Kwang-hyuk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 12/269,286

(22) Filed: Nov. 12, 2008

(65) Prior Publication Data

US 2009/0295989 A1 Dec. 3, 2009

(30) Foreign Application Priority Data

May 28, 2008 (KR) ........................ 10-2008-0049683

(51) Int. Cl.

*H04N 7/173* (2011.01)

*H04N 7/18* (2006.01)

(52) U.S. Cl.

USPC .............................. 725/133; 725/80; 725/112

(58) Field of Classification Search

USPC ........................................... 725/80, 112, 133

See application file for complete search history.

(56) References Cited

U.S. PATENT DOCUMENTS

| | | | | |
|---|---|---|---|---|
| 6,097,441 | A * | 8/2000 | Allport | 348/552 |
| 2002/0059644 | A1* | 5/2002 | Andrade et al. | 725/136 |
| 2002/0162120 | A1* | 10/2002 | Mitchell | 725/135 |
| 2005/0055722 | A1* | 3/2005 | Lym | 725/80 |
| 2005/0278737 | A1* | 12/2005 | Ma et al. | 725/40 |
| 2008/0077965 | A1* | 3/2008 | Kamimaki et al. | 725/105 |
| 2008/0120652 | A1* | 5/2008 | Guzman et al. | 725/59 |
| 2008/0209492 | A1* | 8/2008 | Matsuura et al. | 725/117 |
| 2009/0158361 | A1* | 6/2009 | Tsusaka et al. | 725/80 |
| 2011/0072461 | A1* | 3/2011 | Moon et al. | 725/40 |

* cited by examiner

*Primary Examiner* — Chris Parry

(74) *Attorney, Agent, or Firm* — Sughrue Mion, PLLC

(57) ABSTRACT

Provided are method and apparatus for transmitting/receiving broadcasting content. The method of transmitting broadcasting content includes generating metadata including at least one of information about an acquisition route of at least one additional content related to the broadcasting content and information about a target device to use the at least one additional content and transmitting the metadata and a broadcasting signal including the broadcasting content.

30 Claims, 5 Drawing Sheets

METHOD AND APPARATUS FOR TRANSMITTING CONTENT, AND METHOD AND APPARATUS FOR RECEIVING CONTENT

CROSS-REFERENCE TO RELATED PATENT APPLICATION

This application claims the benefit of Korean Patent Application No. 10-2008-0049683, filed on May 28, 2008, in the Korean Intellectual Property Office, the disclosure of which is incorporated herein in its entirety by reference.

BACKGROUND OF THE INVENTION

1. Field of the Invention

The present invention relates to a method and apparatus for transmitting/receiving content, and more particularly, to a method and apparatus for transmitting/receiving broadcasting content.

2. Description of the Related Art

Owing to the advancements of digital technologies, broadcasting transmitters can not only transmit an audio/video (A/V) stream providing a broadcasting service, but also additional data, such as electronic program guide (EPG) data. However, the type of content that can be reproduced by conventional consumer electronic (CE) devices is limited and such a limitation is also valid in the case of broadcasting receivers. Since the type of content that can be reproduced by broadcasting receivers is limited, only content of a type that can be reproduced by a broadcasting signal receiver is included in the broadcasting signal.

As such, since only a limited type of content is included in a broadcasting signal, complex processes are required for a user to view content having a different type from the broadcasting content.

First, a user searches for content (for example, original soundtrack (OST), a script, or a video clip) that is related to broadcasting content and can be reproduced by another CE device in an external communication network, such as the Internet.

When the desired content is found, the content is downloaded to a personal computer (PC).

Then, the user transfers the downloaded content to a CE device that can reproduce the downloaded content via certain software.

As such, inconvenient processes are performed by the user to view content that is related to broadcasting content and cannot be reproduced by a broadcasting receiver.

SUMMARY OF THE INVENTION

The present invention provides a method and apparatus for transmitting/receiving broadcasting content, which can easily acquire additional content related to broadcasting content.

According to an aspect of the present invention, there is provided a method of transmitting broadcasting content, the method including: generating metadata that comprises information about an acquisition route of additional content related to the broadcasting content; and transmitting the metadata and a broadcasting signal comprising the broadcasting content.

The metadata may further include at least one of information about a target device to consume the additional content, a name of the additional content, type information of the additional content, and a limitation related to use of the additional content.

The additional content may be transmitted by being included in the broadcasting signal.

The information about an acquisition route may include location information in an external network that can acquire the additional content.

The limitation may include expiration information that indicates a period of using the additional content.

According to another aspect of the present invention, there is provided a method of receiving broadcasting content, the method including: receiving a broadcasting signal including the broadcasting content, and metadata including information about an acquisition route of additional content related to the broadcasting content; and acquiring the additional content based on the information about an acquisition route.

The metadata may further include information about a target device to use the additional data, and the method may further include transmitting the acquired additional content to a corresponding target device based on the information about a target device.

The metadata may further include at least one of a name of the additional content, type information of the additional content, and a limitation related to use of the additional content.

The additional content may be received by being included in the broadcasting signal.

The information about an acquisition route may include location information in an external network that can acquire the additional content.

The transmitting may include acquiring information about an available external device.

The limitation may include expiration information that indicates a period of using the additional content.

According to another aspect of the present invention, there is provided an apparatus for transmitting broadcasting content, the apparatus including: a metadata generator, which generates metadata including information about additional content related to the broadcasting content; and a transmitter, which transmits the metadata, and a broadcasting signal comprising the broadcasting content.

According to another aspect of the present invention, there is provided an apparatus for receiving broadcasting content, the apparatus including: a receiver, which receives a broadcasting signal including the broadcasting content, and metadata including information about an acquisition route of additional content related to the broadcasting content; and a content acquirer, which acquires the additional content based on the information about an acquisition route.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Hereinafter, the present invention will be described more fully with reference to the accompanying drawings, in which exemplary embodiments of the invention are shown.

Figure 1:
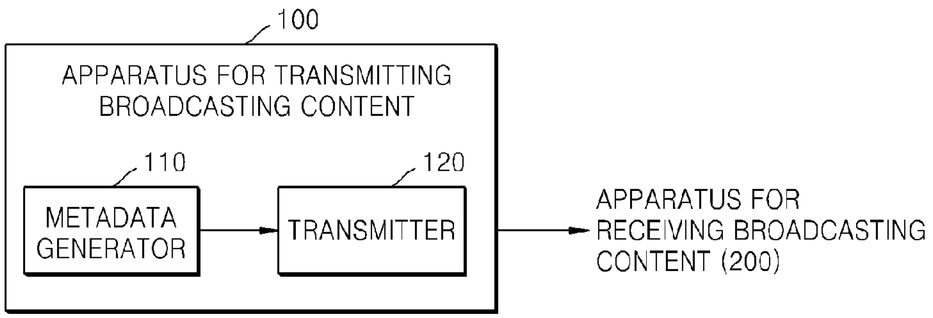
FIG. 1 is a diagram illustrating an apparatus for transmitting broadcasting content according to an exemplary embodiment of the present invention.

FIG. 1 is a diagram illustrating an apparatus 100 for transmitting broadcasting content according to an embodiment of the present invention.

The apparatus 100 according to the current embodiment includes a metadata generator 110 and a transmitter 120.

The metadata generator 110 generates metadata including information about additional content related to broadcasting content included in a broadcasting signal. Examples of the additional content include music content used as background music of the broadcasting content, a script related to the broadcasting content, and a video clip for providing highlights of the broadcasting content. Accordingly, the additional content is related to the broadcasting content, and the type of the additional content is irrelevant as long as it can be reproduced in another CE device.

The metadata includes information about an acquisition route of the additional content. When the additional content is transmitted with the broadcasting content in the broadcasting signal, the information about an acquisition route includes information indicating that the additional content is included in the broadcasting signal. However, when the additional content is transmitted separately from the broadcasting signal, location information about where the additional content can be acquired is included in the information about an acquisition route. For example, a uniform resource locator (URL) of an Internet website where the additional content can be obtained may be included in the information about an acquisition route. As such, since the metadata includes the information about an acquisition route, a user does not have to search for the additional content via a PC.

Also, the metadata may include at least one of information about a target device to consume the additional content and type information about the additional content. An apparatus 200 for receiving broadcasting content that will be described later with reference to FIG. 2 may easily move the additional content to a corresponding CE device by using the information about a target device or the type information. Accordingly, the user does not have to manually move the additional content to the corresponding CE device by using separate software.

Moreover, the metadata may further include at least one of a name (or identifier) of the additional content, and a limitation related to consuming of the additional content. As an example of the limitation, expiration information indicating a period for using the additional content may be included in the metadata. When a predetermined time passes after the user acquires the additional content, the additional content cannot be reproduced, and thus the user may purchase or delete the additional content. Accordingly, the metadata may include information that limits the period of using the additional content, limits a reproducing portion, or limits moving or copying the additional content, so that the user needs to formally purchase the additional content.

The transmitter 120 transmits the broadcasting signal including the broadcasting content, and the metadata. As described above, the broadcasting signal may include the additional content related to the broadcasting content.

Figure 2:
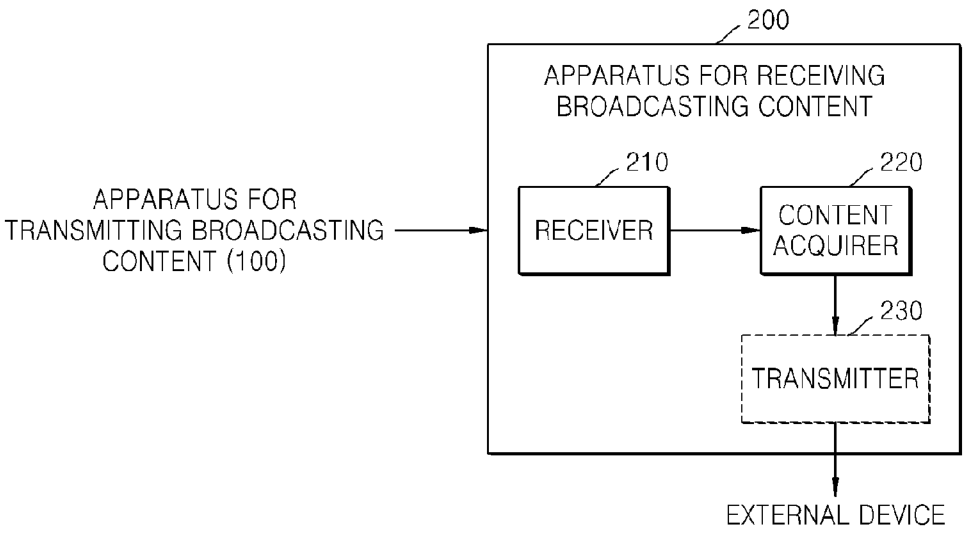
FIG. 2 is a diagram illustrating an apparatus for receiving broadcasting content according to an exemplary embodiment of the present invention.

FIG. 2 is a diagram illustrating an apparatus 200 for receiving broadcasting content according to an embodiment of the present invention.

The apparatus 200 according to the current embodiment includes a receiver 210 and a content acquirer 220.

The receiver 210 receives a broadcasting signal including broadcasting content for providing a broadcasting service and metadata including information about an acquisition route of at least one additional content related to the broadcasting content.

The content acquirer 220 acquires the additional content based on the information about an acquisition route. As described above, the broadcasting signal may include both the broadcasting content and the additional content, or only the broadcasting content. The information about an acquisition route may include a flag indicating whether the additional content is included in the broadcasting signal, and when the additional content is not included in the broadcasting signal, location information about where the additional content can be acquired may be included. Specifically, when the additional content can be acquired via the Internet, an URL of an Internet website may be provided as the location information.

A user may directly acquire the additional content by using the URL, but when the apparatus 200 is connected to an external communication network, such as an IPTV, the additional content can be automatically acquired without extra input of the user.

Also, the user may directly assign the additional content to be acquired by displaying a name of the additional content or type information included in the metadata on a displayer (not shown). In this case, the content acquirer 220 only acquires the additional content that the user desires.

Meanwhile, the apparatus 200 may further include a transmitter 230. The transmitter 230 transmits the acquired additional data to a corresponding target device. The transmitter 230 may include an information acquirer (not shown), which acquires information about available devices connected to the apparatus 200. Specifically, when several CE devices are connected to the apparatus 200 via a home network, the information acquirer searches for all the CE devices connected to the home network. The transmitter 230 checks the available devices by using the information acquirer, and transmits the additional content to a corresponding device. For the transmitter 230 to easily check which device corresponds to the additional content, the metadata may further include at least one of information about a target device to consume the additional data and type information of the additional content. The transmitter 230 determines a device corresponding to the additional content by matching the information about a target device or the type information with the information about available devices.

For example, it is assumed that the content acquirer 220 acquires a music file in an MP3 format used as background music of the broadcasting content from the broadcasting signal, and a script file in a TXT format from an Internet network, and an available device connected to the apparatus 200 is an MP3 player and a PDA.

The MP3 player can only reproduce the music file, while the PDA can reproduce both a script file and a music file. Accordingly, the transmitter 230 transmits the music file to at least one of the MP3 player and the PDA, and the script file to the PDA. According to another embodiment, a music file in a MP3 format may be transmitted only to the PDA or both to the PDA and MP3 player.

The transmitter 230 may automatically transmit the additional content to the corresponding device without an input of the user, or transmitter 230 may transmit the additional content only when an input of the user is received. Also as described in the above example, when the additional content can be reproduced in at least two devices, a device to receive the additional content may be determined by the user or automatically determined according to a predetermined standard. When the predetermined standard does not exist, the additional content is transmitted to all devices that can reproduce the additional content.

Besides the information about an acquisition route and a target device, the metadata may further include at least one of a name of the additional content and a limitation related to consuming of the additional content. The limitation may include any type of information that limits the use of the additional content, such as expiration information that indicates a possible period for reproducing the additional content, movement limitation information that limits the movement of the additional content, and reproduction period limitation information that enables only a part of the additional content to be reproduced.

For example, when the metadata includes the expiration information, the content acquirer 220 does not reproduce the additional content after a predetermined time has elapsed since acquiring the additional content. Accordingly, expired additional content can be reproduced only when the user properly purchases the additional content.

Figure 3:
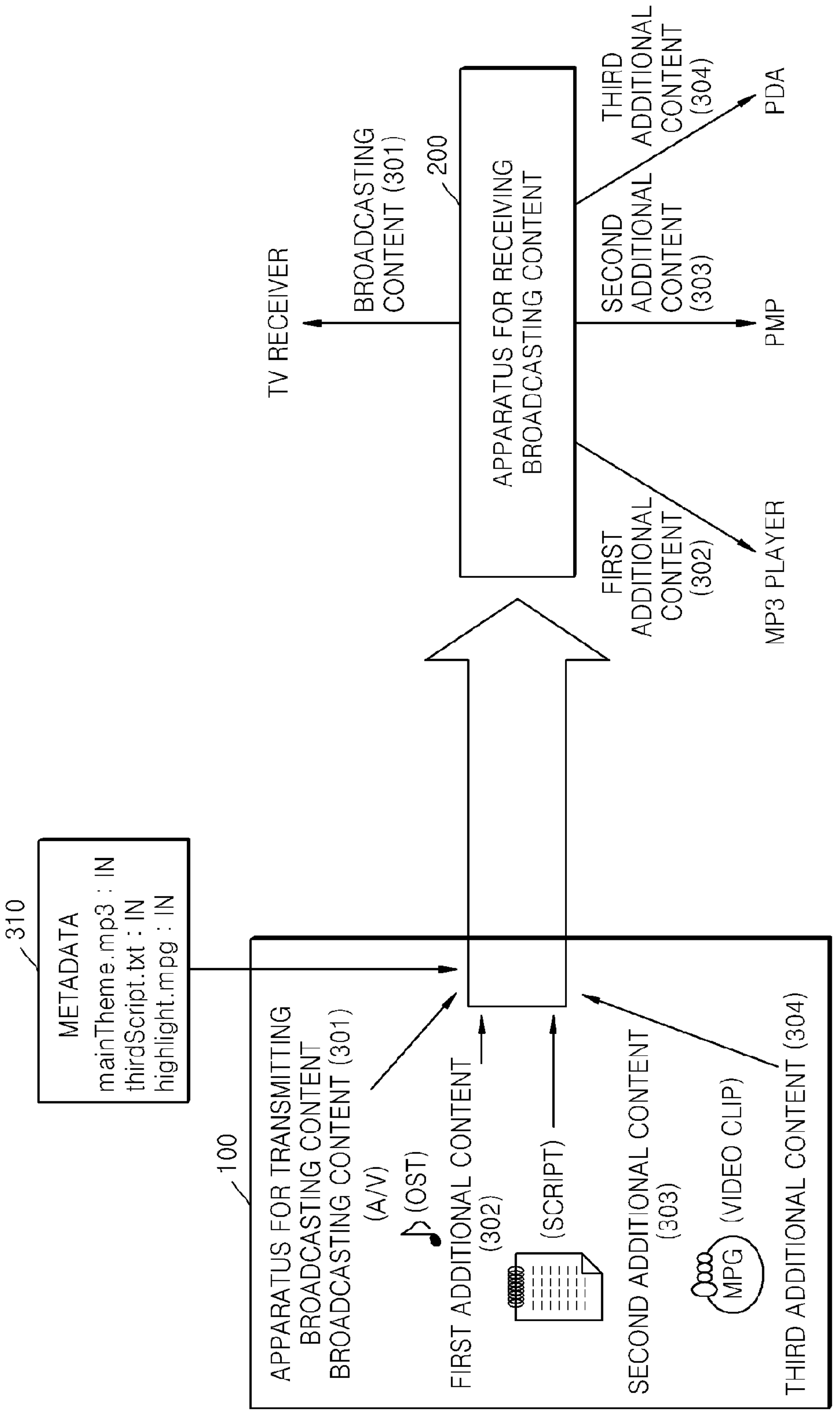
FIG. 3 is a diagram illustrating a system for providing broadcasting content according to an exemplary embodiment of the present invention.

FIG. 3 is a diagram illustrating a system for providing broadcasting content 301 according to an embodiment of the present invention.

In FIG. 3, first additional content 302, second additional content 303, and third additional content 304, which are related to broadcasting content 301 and to be used in other devices, are transmitted with the broadcasting content 301 in a broadcasting signal. The broadcasting content 301 is A/V data, the first additional content 302 is a music file in an MP3 format used as OST of the broadcasting content 301, the second additional content 303 is a script file in a TXT format related to the broadcasting content 301, and the third additional content 304 is a video clip in an MPG format providing highlights of the broadcasting content 301.

The metadata 310 includes names of the additional contents 302, 303, and 304, type information of the additional contents 302, 303, and 304, and information about acquisition routes of the additional contents 302, 303, and 304. The names of the additional contents 302, 303, and 304 transmitted through the metadata 310 are respectively 'mainTheme.mp3', 'thirdScript.txt', and 'highlight.mpg'. It can be seen in FIG. 3, that all additional contents 302, 303, and 304 are transmitted by being included in an inband, i.e. the broadcasting signal. Also, the types of the additional contents 302, 303, and 304 are respectively 'mp3', 'txt', and 'mpg'.

According to an embodiment, the metadata 310 may include information about target devices to consume the additional contents 302, 303, and 304, but the metadata 310 illustrated in FIG. 3 only includes the type information of each of the additional contents 302, 303, and 304. An apparatus 200 for receiving broadcasting content that will be described later determines the target devices to use the additional contents 302, 303, and 304 based on the type information.

Hereinafter, it is assumed that a music file in a MP3 format is reproduced in an MP3 player, a script file in a TXT format is reproduced in a PDA, and an MPG file is reproduced in a portable multimedia player (PMP).

An apparatus 100 for transmitting broadcasting content generates the broadcasting signal including the broadcasting content 301 and the additional contents 302, 303, and 304, and transmits the broadcasting signal and the metadata 310 to the apparatus 200. The apparatus 200 determines the acquisition routes of the additional contents 302, 303, and 304 via the metadata 310. Since the information about acquisition routes show that the additional contents 302, 303, and 304 are all included in the broadcasting signal, the apparatus 200 acquires the broadcasting content 301 and the additional contents 302, 303, and 304 from the broadcasting signal. The apparatus 200 decodes the acquired broadcasting content 301, and outputs the broadcasting content 301 to a TV receiver while transmitting the additional contents 302, 303, and 304 to corresponding devices. The additional contents 302, 303, and 304 may be transmitted with or without an input of the user. Alternatively, only additional content selected by the user may be transmitted.

Figure 4:
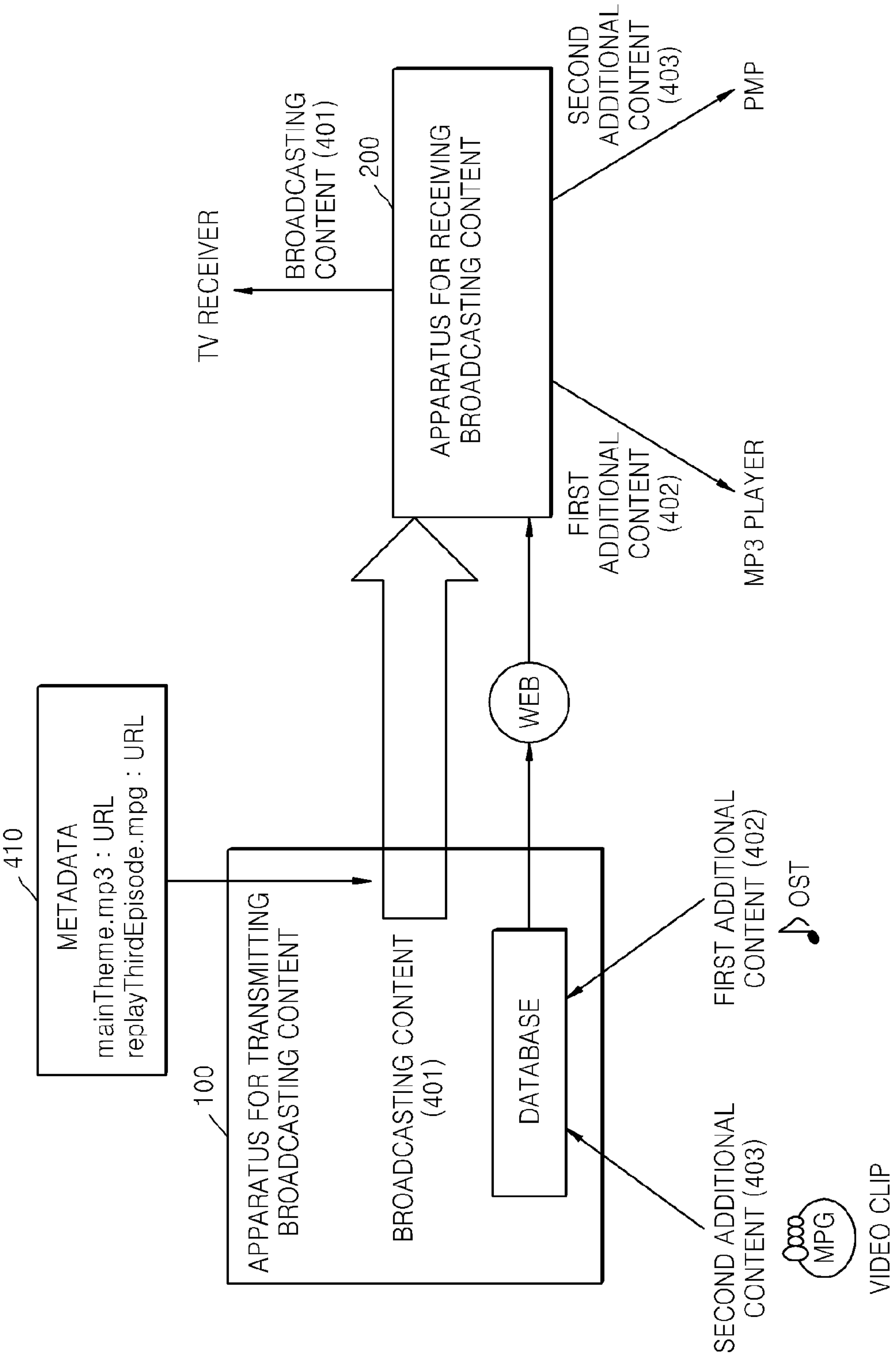
FIG. 4 is a diagram illustrating a system for providing broadcasting content according to another exemplary embodiment of the present invention.

FIG. 4 is a diagram illustrating a system for providing broadcasting content 401 according to another embodiment of the present invention.

In FIG. 4, only the broadcasting content 401 is transmitted by being included in a broadcasting signal. Accordingly, metadata 410 includes location information for acquiring additional contents 402 and 403. In the current embodiment, it is assumed that URLs for acquiring the additional contents 402 and 403 in an external communication network are included in the metadata 410 as information about an acquisition route.

An apparatus 100 for transmitting broadcasting content transmits the broadcasting signal including the broadcasting content 401 and the metadata 410 including the URLs of the additional contents 402 and 403 to an apparatus 200 for receiving broadcasting content. The apparatus 200 decodes the broadcasting content 401 included in the broadcasting signal, and transmits the decoded broadcasting content 401 to a TV receiver. The apparatus 200 acquires the additional contents 402 and 403 from the external communication network by using the URLs included in the metadata 410.

A database storing the additional contents 402 and 403 may be operated by the apparatus 100, or operated by another operator. The apparatus 200 may automatically receive the additional contents 402 and 403 without an input of the user, or selectively receive the additional contents 402 and 403 that the user desires to acquire by displaying information about the additional contents 402 and 403 included in the metadata 410.

When the additional contents 402 and 403 are acquired, the apparatus 200 transmits the additional contents 402 and 403 to a corresponding target device. Thus, the first additional content 402 is transmitted to an MP3 player, and the second additional content 403 is transmitted to a PMP.

Figure 5:
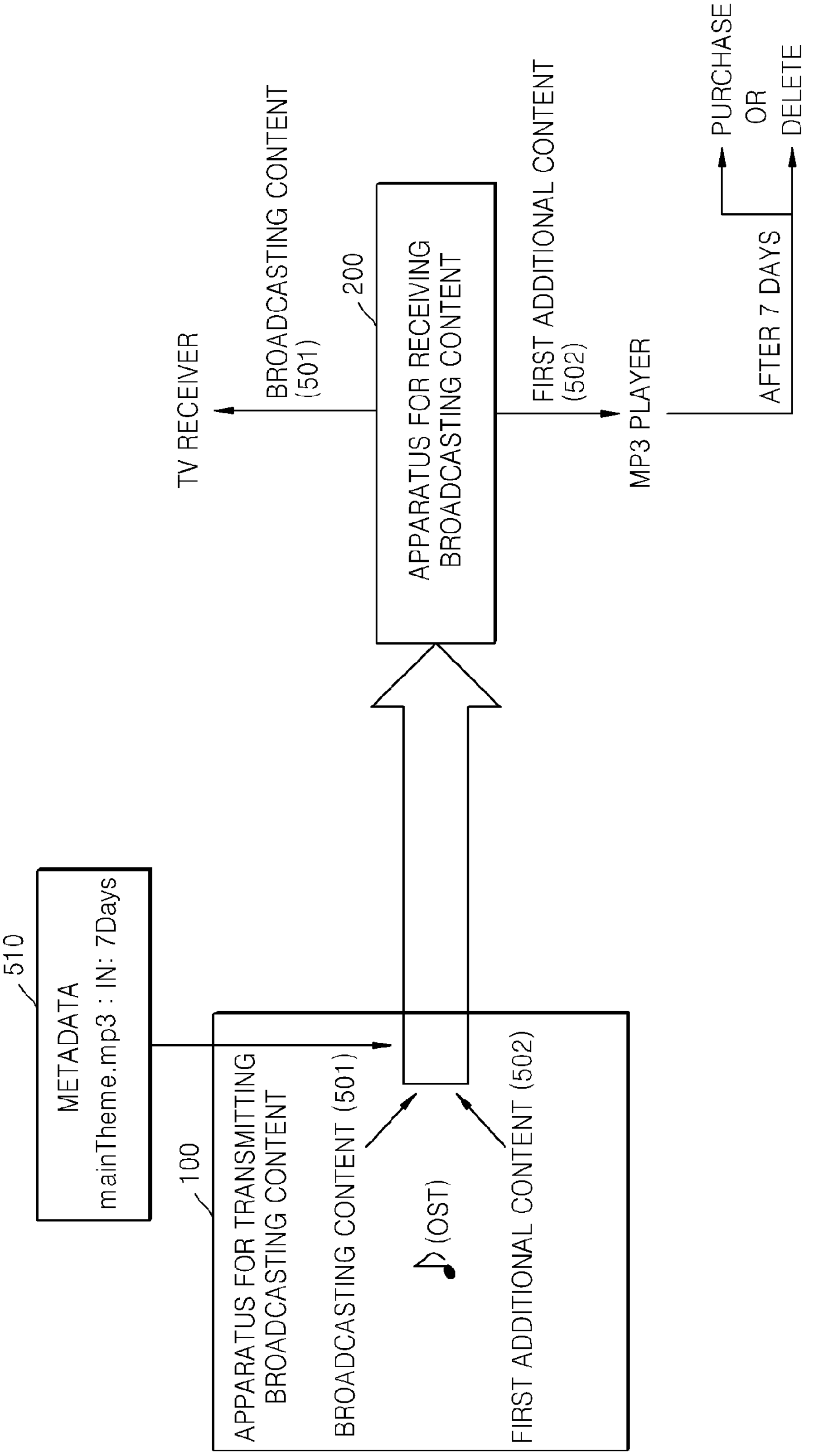
FIG. 5 is a diagram illustrating a system for providing broadcasting content according to another exemplary embodiment of the present invention.

FIG. 5 is a diagram illustrating a system for providing broadcasting content 501 according to another embodiment of the present invention.

Metadata 510 about a first additional content 502 illustrated in FIG. 5 is identical to the metadata 310 illustrated in FIG. 3, except that the metadata 510 includes expiration information about a period of using the first additional content 502.

The first additional content 502, which is used as background music of the broadcasting content 501, is transmitted with the broadcasting content 501 in a broadcasting signal, and is reproduced in an MP3 player. The metadata 510 includes information that the period of using the first additional content 502 is 7 days, and after 7 days, a user cannot reproduce the first additional content 502. If the user wants to continue using the first additional content 502, the user has to officially purchase the first additional content 502.

The metadata 510 in the embodiment of FIG. 5 only includes the expiration information. However, in other embodiments, metadata 510 may also include information about limiting the reproducing number of times or limiting movement of content.

Figure 6:
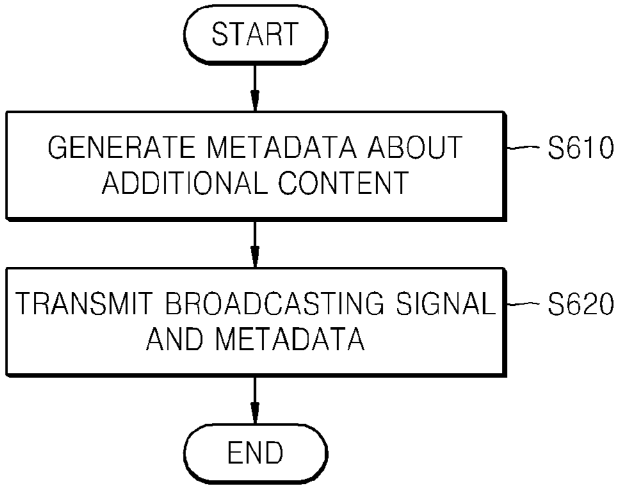
FIG. 6 is a flowchart illustrating a method of transmitting content according to an exemplary embodiment of the present invention.

FIG. 6 is a flowchart illustrating a method of transmitting content according to an embodiment of the present invention.

In operation S610, metadata including information about at least one additional content related to broadcasting content is generated. The metadata includes information about an acquisition route of the additional content. The additional content may be transmitted in a broadcasting signal with the broadcasting content or may be transmitted separately from the broadcasting content. When the additional content is transmitted in the broadcasting signal, information indicating that the additional content is transmitted is included in the information about an acquisition route. When the additional content is transmitted separately from the broadcasting content, location information, such as an URL for acquiring the additional content, is included in the information about an acquisition route.

The metadata may further include at least one of a name of the additional content, type information of the additional content, information about a target device to consume the additional content, and limitation related to consuming of the additional content. As the metadata includes at least one of the type information and the information about the target device, the additional content can easily transfer to a corresponding CE device.

The limitation includes expiration information indicating a period of using the additional content. In this case, when the period of using the additional content has passed, the additional content cannot be reproduced.

In operation S620, the broadcasting signal, including the broadcasting content, and the metadata are transmitted.

Figure 7:
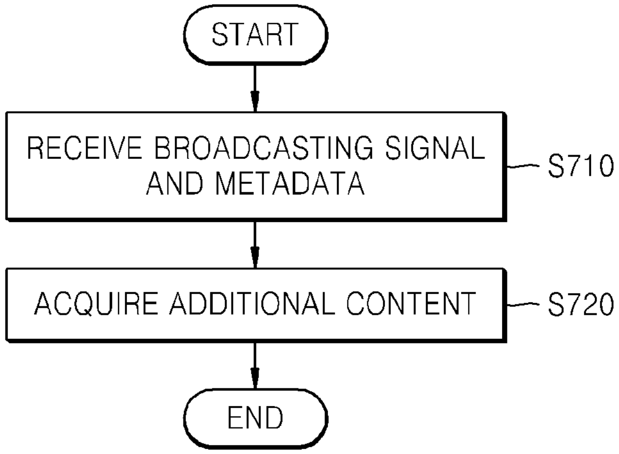
FIG. 7 is a flowchart illustrating a method of receiving content according to an exemplary embodiment of the present invention.

FIG. 7 is a flowchart illustrating a method of receiving content according to an embodiment of the present invention.

In operation S710, a broadcasting signal including broadcasting content and metadata including at least one additional content related to the broadcasting content are received. The metadata includes information about an acquisition route of the additional content.

In operation S720, the additional content is acquired by using the information about an acquisition route.

The metadata may further include at least one piece of information about a target device to consume the additional content and type information of the additional content. In this case, the method may further include transferring the acquired additional content to a corresponding target device.

According to the present invention, additional content can be easily acquired by including information about an acquisition route of the additional content in metadata.

Also, additional content can be transferred easily to a CE device that can reproduce the additional content by including at least one of information about a target device to consume the additional content and type information of the additional content in metadata.

Moreover, a user can be induced to make additional purchases by including a limitation about the use of additional content in metadata.

Embodiments of the present invention can be written as computer programs and can be implemented in general-use digital computers that execute the programs using a computer readable recording medium and computer readable transmission medium. Examples of the computer readable recording medium include magnetic storage media (e.g., ROM, floppy disks, hard disks, etc.), and optical recording media (e.g., CD-ROMs, or DVDs). Examples of the computer readable transmission medium include carrier waves (e.g., transmission through the Internet).

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting broadcasting content, the method comprising:

generating metadata that comprises information about an acquisition route of an additional content related to the broadcasting content and type information of the additional content; and transmitting the metadata and a broadcasting signal comprising the broadcasting content, wherein the broadcasting content is transmitted to a television (TV) receiver, and the additional content is transmitted to a target device which is different from the TV receiver based on the type information of the additional content, and wherein the target device is determined by an input of a user among at least two devices configured to reproduce the additional content.

2. The method of claim 1, wherein the metadata further comprises at least one of a name of the additional content and a limitation related to use of the additional content.

3. The method of claim 2, wherein the additional content is transmitted by being included in the broadcasting signal.

4. The method of claim 2, wherein the information about an acquisition route comprises location information in an external network that can acquire the additional content.

5. The method of claim 2, wherein the limitation related to use of the additional content comprises expiration information that indicates a period of using the additional content.

6. The method of claim 1, wherein the broadcast signal further comprises the metadata.

7. A method of receiving broadcasting content, the method comprising:

receiving metadata and a broadcasting signal comprising the broadcasting content, the metadata comprising information about an acquisition route of additional content related to the broadcasting content and type information of the additional content; and acquiring the additional content based on the information about an acquisition route, wherein the broadcasting content is transmitted to a television (TV) receiver, and the additional content is transmitted to a target device which is different from the TV receiver based on the type information of the additional content, and wherein the target device is determined by an input of a user among at least two devices configured to reproduce the additional content.

8. The method of claim 7, the method further comprises transmitting the acquired additional content to a corresponding type device based on at least one of the information about the target device and the type information of the additional content.

9. The method of claim 8, wherein the transmitting comprises acquiring information about an available external device.

10. The method of claim 7, wherein the metadata further comprises at least one of a name of the additional content and a limitation related to consuming of the additional content.

11. The method of claim 10, wherein the limitation related to consuming of the additional content comprises expiration information that indicates a period of using the additional content.

12. The method of claim 7, wherein the additional content is received by being included in the broadcasting signal.

13. The method of claim 7, wherein the information about an acquisition route comprises location information in an external network that can acquire the additional content.

14. The method of claim 7, wherein the broadcast signal further comprises the metadata.

15. An apparatus for transmitting broadcasting content, the apparatus comprising:

a metadata generator which generates metadata comprising information about an additional content related to the broadcasting content and type information of the additional content; and a transmitter which transmits the metadata and a broadcasting signal comprising the broadcasting content, wherein the broadcasting content is transmitted to a television (TV) receiver, and the additional content is transmitted to a target device which is different from the TV receiver based on the type information of the additional content, and wherein the target device is determined by an input of a user among at least two devices configured to reproduce the additional content.

16. The apparatus of claim 15, wherein the metadata further comprises at least one of a name of the additional content and a limitation related to consuming of the additional content.

17. The apparatus of claim 16, wherein the additional content is transmitted by being included in the broadcasting signal.

18. The apparatus of claim 16, wherein the information about an acquisition route comprises location information in an external network that can acquire the additional content.

19. The apparatus of claim 16, wherein the limitation related to consuming of the additional content comprises expiration information that indicates a period of using the additional content.

20. The apparatus of claim 15, wherein the broadcast signal further comprises the metadata.

21. An apparatus for receiving broadcasting content, the apparatus comprising:

a receiver which receives metadata and a broadcasting signal comprising the broadcasting content, the metadata comprising information about an acquisition route of additional content related to the broadcasting content and type information of the additional content; and a content acquirer which acquires the additional content based on the information about an acquisition route, wherein the broadcasting content is transmitted to a television (TV) receiver, and the additional content is transmitted to a target device which is different from the TV receiver based on the type information of the additional content, and wherein the target device is determined by an input of a user among at least two devices configured to reproduce the additional content.

22. The apparatus of claim 21, the apparatus further comprises a transmitter which transmits the acquired additional content to a corresponding target device based on at least one of the information about the target device and the type information of the additional content.

23. The apparatus of claim 22, wherein the transmitter comprises an information acquirer which acquires information about an available external device.

24. The apparatus of claim 22, wherein the metadata further comprises at least one of a name of the additional content and a limitation related to use of the additional content.

25. The apparatus of claim 24, wherein the limitation related to use of the additional content comprises expiration information that indicates a period of using the additional content.

26. The apparatus of claim 21, wherein the additional content is received by being included in the broadcasting signal.

27. The apparatus of claim 21, wherein the information about an acquisition route comprises location information in an external network that can acquire the additional content.

28. The apparatus of claim 21, wherein the broadcast signal further comprises the metadata.

29. A non-transitory computer readable recording medium having recorded thereon a program for executing a method comprising:

generating metadata that comprises information about an acquisition route of an additional content related to broadcasting content and type information of the additional content; and transmitting the metadata and a broadcasting signal comprising the broadcasting content, wherein the broadcast content is transmitted to a television (TV) receiver, and the additional content is transmitted to a target device which is different from the TV receiver based on the type information of the additional content, and wherein the target device is determined by an input of a user among at least two devices configured to reproduce the additional content.

30. The non-transitory computer readable medium of claim 29, wherein the broadcast signal further comprises the metadata.

* * * * *